(12) United States Patent
Chen et al.

(10) Patent No.: US 8,924,763 B2
(45) Date of Patent: *Dec. 30, 2014

(54) SYNCHRONIZING COMPUTE NODE TIME BASES IN A PARALLEL COMPUTER

(75) Inventors: Dong Chen, Croton on Hudson, NY (US); Daniel A. Faraj, Rochester, MN (US); Thomas M. Gooding, Rochester, MN (US); Philip Heidelberger, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 361 days.

This patent is subject to a terminal disclaimer.

(21) Appl. No.: 13/327,107

(22) Filed: Dec. 15, 2011

(65) Prior Publication Data

US 2013/0159760 A1 Jun. 20, 2013

(51) Int. Cl.
*G06F 1/12* (2006.01)

(52) U.S. Cl.
CPC .................................... *G06F 1/12* (2013.01)
USPC ........................................ 713/400; 716/113

(58) Field of Classification Search
USPC ......... 713/1, 2, 100, 300, 310, 320, 321, 322, 713/323, 324, 330, 340, 375, 400, 500, 600
See application file for complete search history.

(56) References Cited

U.S. PATENT DOCUMENTS

| | | | | |
|---|---|---|---|---|
| 5,499,349 A | * | 3/1996 | Nikhil et al. | 712/26 |
| 5,740,067 A | * | 4/1998 | Hathaway | 716/113 |
| 6,117,180 A | * | 9/2000 | Dave et al. | 703/20 |
| 7,958,285 B1 | * | 6/2011 | Chiu et al. | 710/52 |
| 2003/0093569 A1 | * | 5/2003 | Sivier et al. | 709/248 |
| 2008/0270800 A1 | | 10/2008 | Krober et al. | |
| 2009/0248900 A1 | | 10/2009 | Marucheck et al. | |
| 2011/0252264 A1 | * | 10/2011 | Solinas et al. | 713/400 |

OTHER PUBLICATIONS

Jones et al., "A Clock Synchronization Strategy For Minimizing Clock Variance At Runtime In High-End Computing Environments", 2010 22nd International Symposium on Computer Architecture and High Performance Computing (SBAC-PAD), Oct. 27-30, 2010, pp. 207-214, Institute of Electrical and Electronics Engineers (IEEE), Digital Object Identifier: 10.1109/SBAC-PAD.2010.33, USA.

(Continued)

*Primary Examiner* — Kim Huynh
*Assistant Examiner* — Paul J Yen
(74) *Attorney, Agent, or Firm* — Biggers Kennedy Lenart Spraggins LLP

(57) ABSTRACT

Synchronizing time bases in a parallel computer that includes compute nodes organized for data communications in a tree network, where one compute node is designated as a root, and, for each compute node: calculating data transmission latency from the root to the compute node; configuring a thread as a pulse waiter; initializing a wakeup unit; and performing a local barrier operation; upon each node completing the local barrier operation, entering, by all compute nodes, a global barrier operation; upon all nodes entering the global barrier operation, sending, to all the compute nodes, a pulse signal; and for each compute node upon receiving the pulse signal: waking, by the wakeup unit, the pulse waiter; setting a time base for the compute node equal to the data transmission latency between the root node and the compute node; and exiting the global barrier operation.

12 Claims, 7 Drawing Sheets

(56) References Cited

OTHER PUBLICATIONS

Becker et al., "Replay-Based Synchronization Of Timestamps In Event Traces Of Massively Parallel Applications", International Conference on Parallel Processing—Workshops 2008 (ICPP-W'08), Sep. 8-12, 2008, pp. 212-219, Institute of Electrical and Electronics Engineers (IEEE), Digital Object Identifier: 10.1109/ICPP-W.2008.17, USA.

Doleschal et al., "Internal Timer Synchronization For Parallel Event Tracing", 2008 Proceedings of the 15th European PVM/MPI Users' Group Meeting on Recent Advances in Parallel Virtual Machine and Message Passing Interface, Sep. 2008, pp. 202-209, vol. 5205, Springer Berlin Heidelberg, NY, Digital Object Identifier: 10.1007/978-3-540-87475-1_29.

Cristian et al.; "Probabilistic Internal Clock Synchronization", Proceedings of the Thirteenth Symposium on Reliable Distributed Systems, May 2003, pp. 22-31, California.

Gusella et al., "The Accuracy of the Clock Synchronization Achieved by TEMPO In Berkeley UNIX 4.3BSD", IEEE Transactions on Software Engineering, Jul. 1989, vol. 15, No. 7, pp. 847-853, Institute of Electrical and Electronics Engineers (IEEE), Digital Object Identifier: 10.1109/32.29484, USA.

* cited by examiner

SYNCHRONIZING COMPUTE NODE TIME BASES IN A PARALLEL COMPUTER

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for synchronizing compute node time bases in a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modem processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In such a manner, a torus network lends itself to point to point operations. In a tree network, the nodes typically are connected into a binary tree: each node has a parent, and two children (although some nodes may only have zero children or one child, depending on the hardware configuration). Although a tree network typically is inefficient in point to point communication, a tree network does provide high bandwidth and low latency for certain collective operations, message passing operations where all compute nodes participate simultaneously, such as, for example, an allgather operation. In computers that use a torus and a tree network, the two networks typically are implemented independently of one another, with separate routing circuits, separate physical links, and separate message buffers.

SUMMARY OF THE INVENTION

Methods, apparatus, and products for synchronizing compute node time bases in a parallel computer are disclosed in this specification. The compute nodes are organized for data communications in a tree network and one compute node in the tree network designated as a root node. Each of the compute nodes executes a plurality of threads. Synchronizing compute node time bases includes, for each compute node: calculating data transmission latency from the root node to the compute node; configuring a thread of the compute node as a pulse waiter; initializing a wakeup unit, the wakeup unit configured to wake the pulse waiter responsive to receiving a pulse signal from the root node; and performing a local barrier operation. Upon each node completing the local barrier operation, all compute nodes entering, by a global barrier operation. Upon all the compute nodes entering the global barrier operation, the root node sends, to all the compute nodes, a pulse signal. Each compute node upon receiving the pulse signal carries out the following steps: waking, by the wakeup unit, the pulse waiter; setting a time base for the compute node equal to the data transmission latency between the root node and the compute node; and exiting the global barrier operation.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
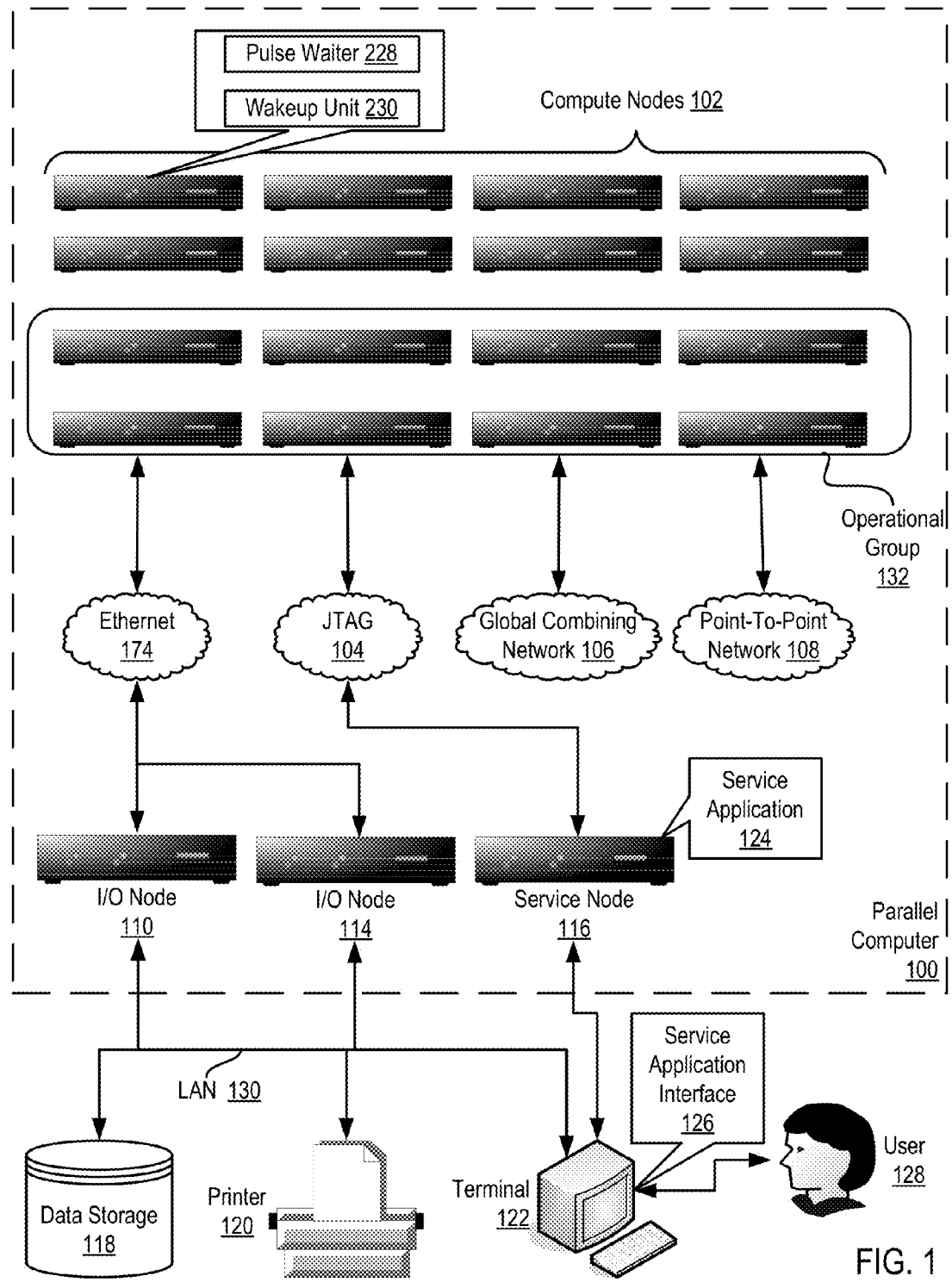
FIG. 1 illustrates an exemplary system for synchronizing compute node time bases in a parallel computer according to embodiments of the present invention.

Exemplary methods, apparatus, and products for synchronizing compute node time bases in a parallel computer in accordance with the present invention are described with reference to the accompanying drawings, beginning with FIG. 1. FIG. 1 illustrates an exemplary system for synchronizing compute node time bases in a parallel computer according to embodiments of the present invention. The system of FIG. 1 includes a parallel computer (100), non-volatile memory for the computer in the form of a data storage device (118), an output device for the computer in the form of a printer (120), and an input/output device for the computer in the form of a computer terminal (122).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use in systems configured according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node.

Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

The parallel computer (100) of FIG. 1 operates generally for synchronizing compute node time bases in a parallel computer in accordance with embodiments of the present invention. The compute nodes (102) in the example of FIG. 1 are organized for data communications in a tree network and one compute node in the tree network is designated as a root node. Each of the compute nodes (102) also executes a plurality of threads.

A time base for a compute node is the compute node's internal clock. Such a clock may be utilized in program execution, in error logging, in messaging, and in other aspects of parallel application execution. Moreover, synchronization of clocks of two different nodes of the same parallel computer may be useful in the same aspects of parallel application execution. In a parallel computer with many compute nodes, however, each compute node may have a different initial time base when booted and such time bases (such clocks) may vary slightly in rate when compute nodes are non-homogeneous. Over a period of time, then, one compute node's time base may not match or by synchronized with another compute node's time base.

Synchronizing compute node time bases in accordance with embodiments of the present invention includes, for each compute node (102): calculating data transmission latency from the root node to the compute node; configuring a thread of the compute node as a pulse waiter; initializing a wakeup unit (230). The wakeup unit is configured to wake the pulse waiter (228) responsive to receiving a pulse signal from the root node. A pulse signal is a notification from the root node that all other compute nodes have entered a global barrier operation. Once the wakeup unit (230) is initialized, each compute node performs a local barrier operation.

Upon each node completing the local barrier operation, all the compute nodes (102), enter a global barrier operation and, upon all the compute nodes entering the global barrier operation, the root node sends, all the compute nodes, a pulse signal. Each compute node upon receiving the pulse signal, wakes the pulse waiter, sets a time base for the compute node equal to the data transmission latency between the root node and the compute node, and exits the global barrier operation. In this way, the time bases for the compute nodes are synchronized in light of or in dependence upon the data transmission latency between the root and the compute node.

Such time bases and latencies may be stored for later use. The time bases and latencies, for example, may be stored as a formula that is evaluated, in dependence upon network and operational group characteristics, at boot time of a parallel computer or upon establishing an operational group of compute nodes. That is, rather than calculating a new time base upon each and every boot or operational group establishment, the calculation may be made once and re-applied upon subsequent boots.

Synchronizing compute node time bases according to embodiments of the present invention is generally implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters. For further explanation, therefore, FIG. 2 sets forth a block diagram of an example compute node (102) useful in a parallel computer capable of synchronizing compute node time bases according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a high-speed memory bus (155) and through a bus adapter (194) and an extension bus (168) to other components of the compute node. Stored in RAM (156) is an application program (159), a module of computer program instructions that carries out parallel, user-level data processing using parallel algorithms.

Also stored RAM (156) is a parallel communications library (161), a library of computer program instructions that carry out parallel communications among compute nodes, including point-to-point operations as well as collective operations. A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Figure 2:
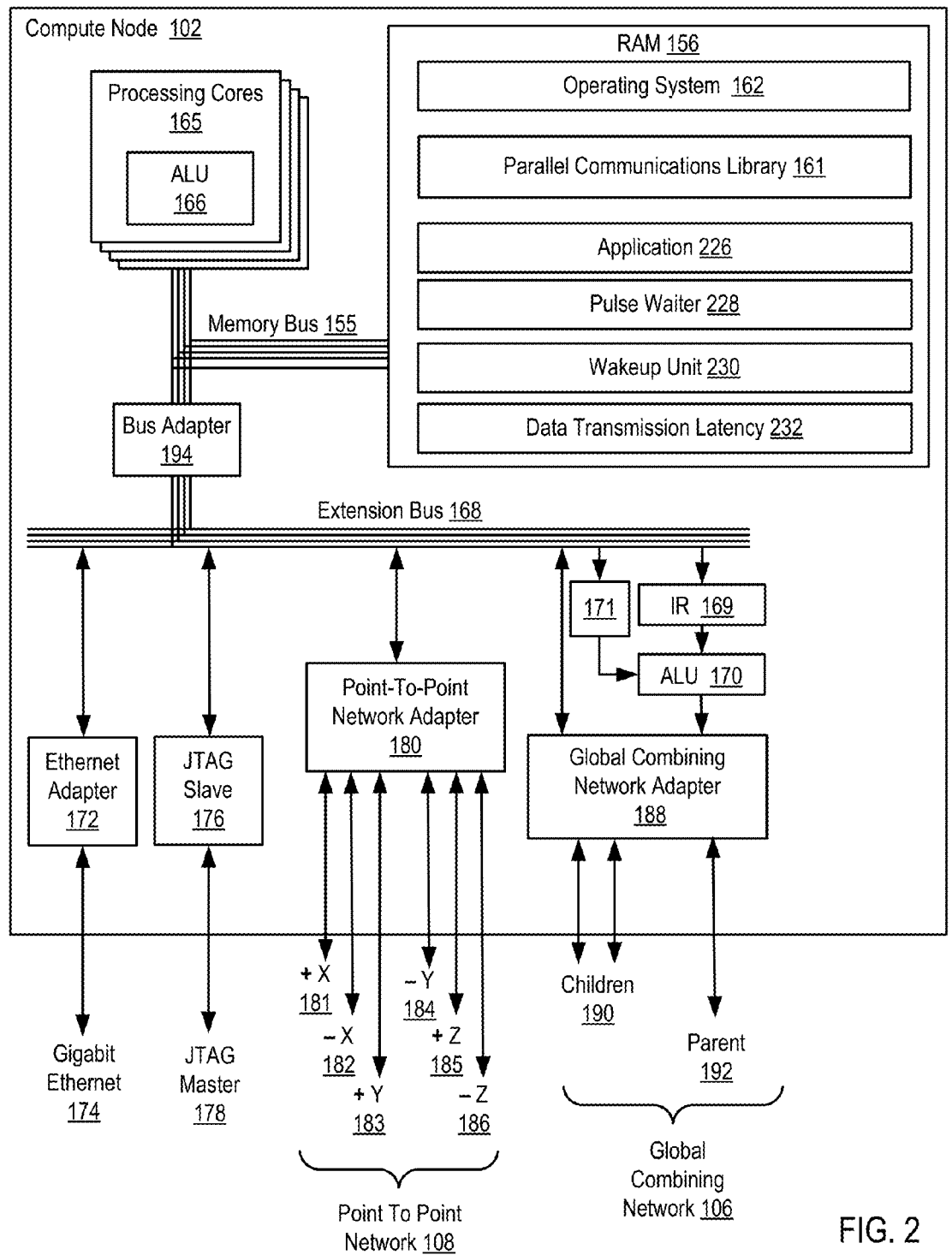
FIG. 2 sets forth a block diagram of an example compute node useful in a parallel computer capable of synchronizing compute node time bases according to embodiments of the present invention.

Also stored in RAM (156) is an application (226). The application (226) in the example of FIG. 2 may be configured as one instance of a parallel application with other instances executing amongst a plurality of compute nodes organized into an operational group and a tree network. The application (226) in the example of FIG. 2 is configured for synchronizing compute node time bases in a parallel computer in accordance with embodiments of the present. The compute nodes may be organized into a tree network, such as the network supported by the global combining network adapter (188) of the compute node (102). The tree network may be implemented as a logical network. The application (226) may participate in compute node time base synchronization in accordance with embodiments of the present invention by calculating data transmission latency (232) from the root node to the compute node (102); configuring a thread of the compute node as a pulse waiter (228). The pulse waiter is configured to take action upon receiving a pulse signal from the root node, where the pulse signal is a notification from the root node that all other compute nodes have entered a global barrier operation. The application (226) of FIG. 2 may also initialize a wakeup unit (230). The wakeup unit (230) is configured to wake the pulse waiter responsive to receiving a pulse signal from the root node. Although depicted in main computer memory—RAM (156)—in the example of FIG. 2, the wakeup unit (230) may also be implemented as logic or firmware of a network adapter, such as the goal combining network adapter (188) of FIG. 2. After initializing the wakeup unit (230), the application (226)—the threads comprising instances of execution of the application—performs a local barrier operation.

Upon each node in the tree network completing a local barrier operation, all compute nodes enter a global barrier operation. Upon all the compute nodes entering the global barrier operation, the root node in the tree network sends a pulse signal to all the compute nodes. A pulse signal is a notification that all nodes have entered the global barrier. Each compute node (102), upon receiving the pulse signal, wakes the pulse waiter (228); and sets a time base for the compute node equal to the data transmission latency (232) between the root node and the compute node (102); and exiting the global barrier operation.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus useful for synchronizing compute node time bases in a parallel computer include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient alternative access point into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processor core registers and memory in compute node (102) for use in dynamically reassigning a connected node to a block of compute nodes useful in systems for synchronizing compute node time bases in a parallel computer to embodiments of the present invention.

The data communications adapters in the example of FIG. 2 include a Point-To-Point Network Adapter (180) that couples example compute node (102) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) that is optimal for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3A:
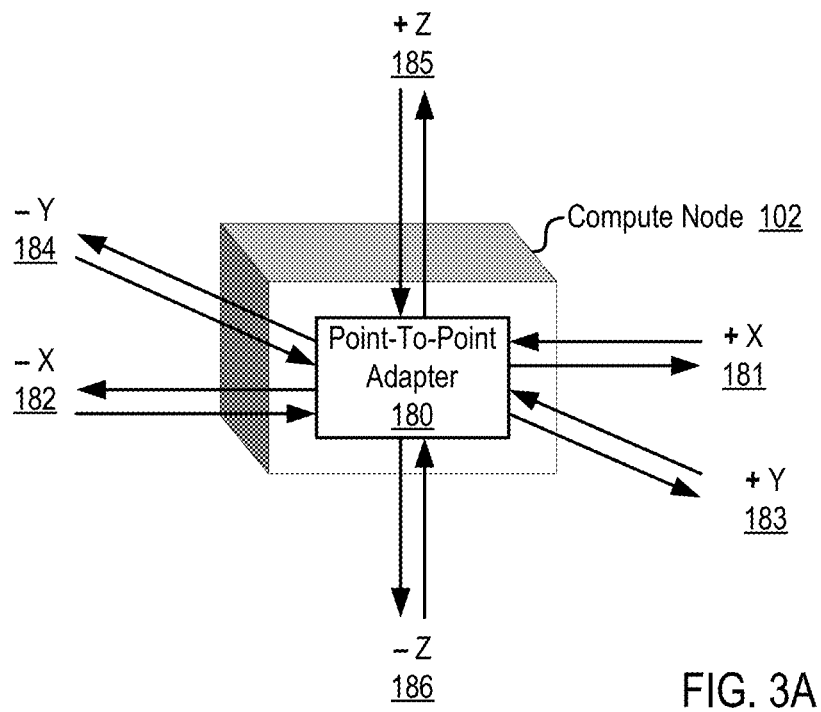
FIG. 3A sets forth a block diagram of an example Point-To-Point Adapter useful in systems for synchronizing compute node time bases in a parallel computer according to embodiments of the present invention.

For further explanation, FIG. 3A sets forth a block diagram of an example Point-To-Point Adapter (180) useful in systems for synchronizing compute node time bases in a parallel computer according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3A provides data communication along an x-axis through four unidirectional data communications links, to and from the next node in the −x direction (182) and to and from the next node in the +x direction (181). The Point-To-Point Adapter (180) of FIG. 3A also provides data communication along a y-axis through four unidirectional data communications links, to and from the next node in the −y direction (184) and to and from the next node in the +y direction (183). The Point-To-Point Adapter (180) of FIG. 3A also provides data communication along a z-axis through four unidirectional data communications links, to and from the next node in the −z direction (186) and to and from the next node in the +z direction (185).

Figure 3B:
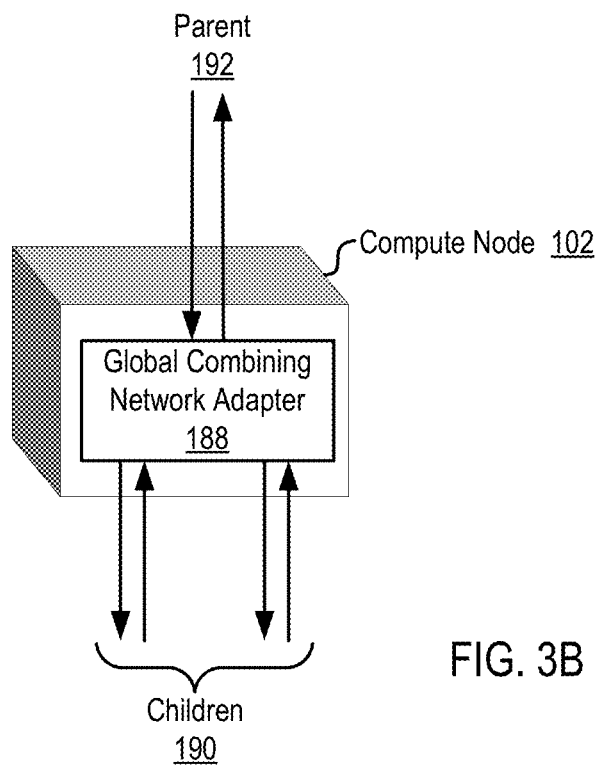
FIG. 3B sets forth a block diagram of an example Global Combining Network Adapter useful in systems for synchronizing compute node time bases in a parallel computer according to embodiments of the present invention.

For further explanation, FIG. 3B sets forth a block diagram of an example Global Combining Network Adapter (188) useful in systems for synchronizing compute node time bases in a parallel computer according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from children nodes of a global combining network through four unidirectional data communications links (190), and also provides data communication to and from a parent node of the global combining network through two unidirectional data communications links (192).

Figure 4:
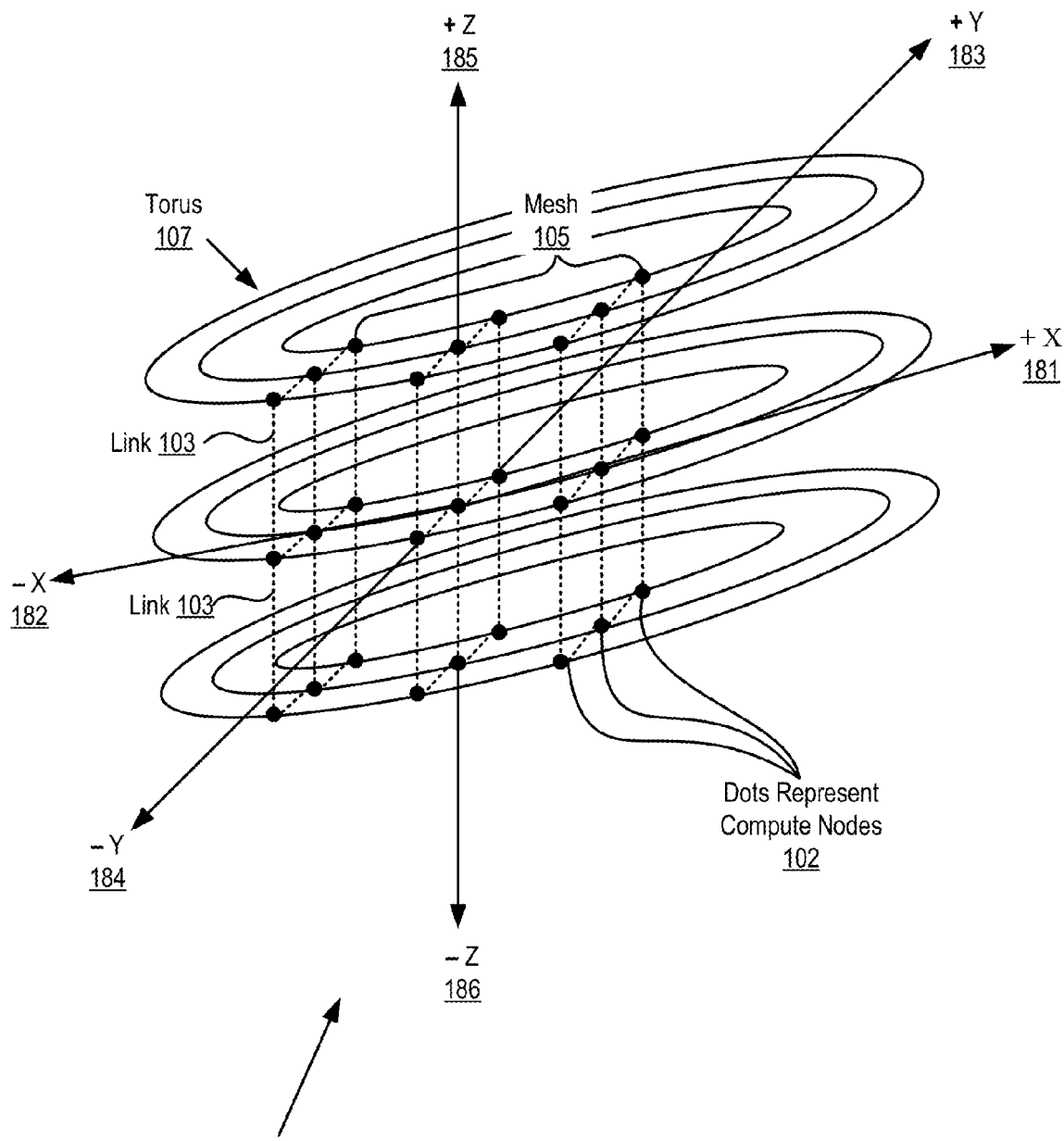
FIG. 4 sets forth a line drawing illustrating an example data communications network optimized for point-to-point operations useful in systems capable of synchronizing compute node time bases in a parallel computer according to embodiments of the present invention.

For further explanation, FIG. 4 sets forth a line drawing illustrating an example data communications network (108) optimized for point-to-point operations useful in systems capable of synchronizing compute node time bases in a parallel computer according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations for use in synchronizing compute node time bases in a parallel computer in accordance with embodiments of the present invention may contain only a few compute nodes or may contain thousands of compute nodes. For ease of explanation, the data communications network of FIG. 4 is illustrated with only three dimensions, but readers will recognize that a data communications network optimized for point-to-point operations for use in synchronizing compute node time bases in a parallel computer in accordance with embodiments of the present invention may in facet be implemented in two dimensions, four dimensions, five dimensions, and so on. Several supercomputers now use five dimensional mesh or torus networks, including, for example, IBM's Blue Gene Q™.

Figure 5:
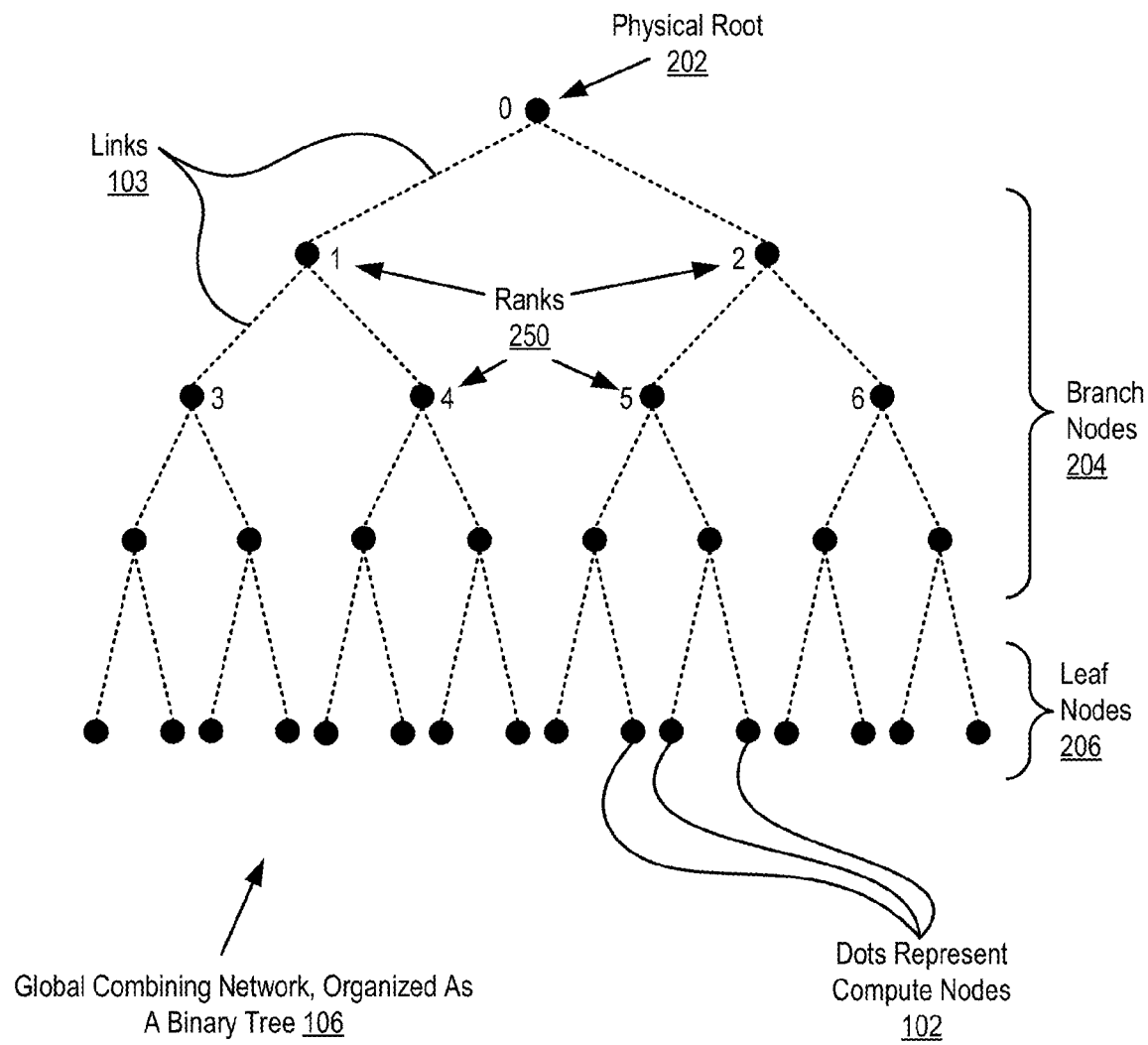
FIG. 5 sets forth a line drawing illustrating an example global combining network useful in systems capable of synchronizing compute node time bases in a parallel computer according to embodiments of the present invention.

For further explanation, FIG. 5 sets forth a line drawing illustrating an example global combining network (106) useful in systems capable of synchronizing compute node time bases in a parallel computer according to embodiments of the present invention. The example data communications network of FIG. 5 includes data communications links (103) connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network (106) optimized for collective operations for use in synchronizing compute node time bases in a parallel computer in accordance with embodiments of the present invention may contain only a few compute nodes or may contain thousands of compute nodes.

In the example of FIG. 5, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Although the tree network is depicted in the example of FIG. 5 as a physical binary tree network, readers of skill in the art will recognize that synchronizing compute node time bases in accordance with embodiments of the present invention may be carried out in other implementations of a tree network, including a non-binary tree and a logical tree rather than physical.

Figure 6:
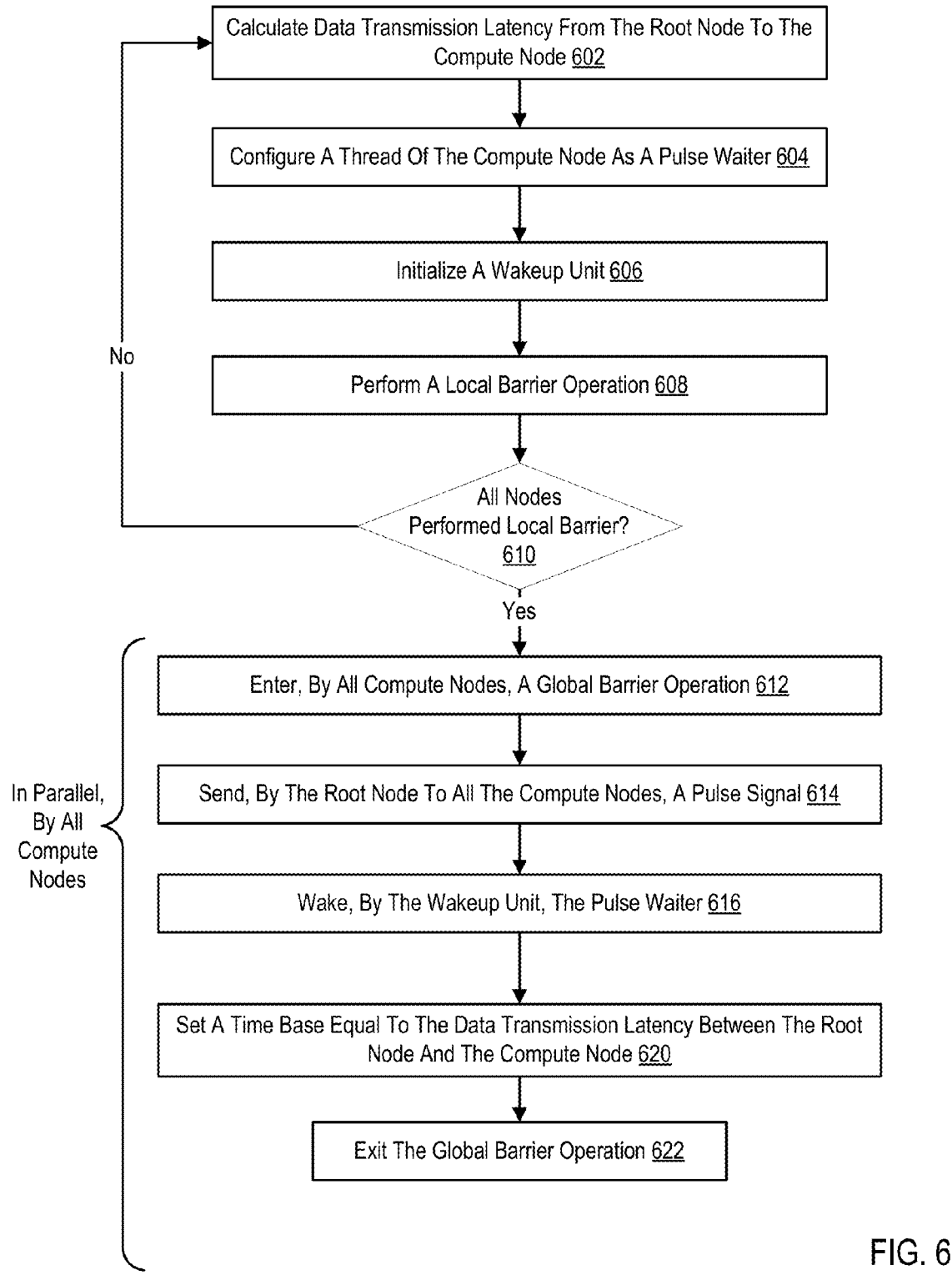
FIG. 6 sets forth a flow chart illustrating an example method of synchronizing compute node time bases in a parallel computer according to embodiments of the present invention.

For further explanation, FIG. 6 sets forth a flow chart illustrating an example method synchronizing compute node time bases in a parallel computer according to embodiments of the present invention. The compute nodes in the example of FIG. 6 are organized for data communications in a tree network, with one compute node in the tree network designated as a root node. Each compute nodes executes a plurality of threads. Each compute node in the parallel computer may also include a plurality of processor cores, with each core executing one or more of the plurality of threads.

In some embodiments, the method of FIG. 6 may be carried out in a non-homogenous parallel computer, where one or more of the compute nodes are formed of disparate computer hardware and software configurations. The term 'non-homogenous' is used here to describe compute nodes having varying, or different, architectures or resources. Consider, for example, two non-homogenous compute nodes: a first compute node with 2GB of DDR3 (Double Data Rate 3) RAM, a 1.8 GHz (Gigahertz) quad-core processor, and 1 gigabit per second (Gbps) Ethernet adapter; and a second compute node with 4GB of DDR 2 (Double Data Rate 2) RAM, a 2.6 GHz dual-core processor, and a 10 Gbps Ethernet adapter. Each of these compute nodes when receiving a message, processing the message, and executing an computer program instruction responsive to the contents of the message, may complete the execution of the computer program instruction in different amounts of time. That is, even in instances in which the first and second compute node are sent an identical message at the same time, the resulting processing by each node may take a different amount of time. In this way, the compute nodes are said to be 'non-homogenous.' Homogenous nodes, by contrast, have the same or very similar architecture. Homogenous nodes are generally capable of receiving a message, processing the message, and executing computer program instructions in nearly the same amount of time or within some known, minor tolerance.

The method of FIG. 6 includes a number of steps carried out in several iterations, once for each compute node, that results in each compute node in the tree network calculating a data transmission latency from the root node to the compute node. The latency calculation portion of the method of FIG. 6 includes calculating (602) data transmission latency from the root node to the compute node; configuring (604) a thread of the compute node as a pulse waiter; initializing (606) a wakeup unit; and performing (608) a local barrier operation.

Data transmission latency from the root node to the compute node describes the amount of time between a root node initiating the sending of data to a compute node and the compute node receiving that data. Calculating (602) data transmission latency from the root node to the compute node may be carried out in various ways. One way for example to calculate data transmission latency from the root node to the compute node includes calculating the data transmission latency as the sum of the predetermined latency of network links coupling the compute node to the root node. Consider, for example one compute node, coupled to the root node through two network links. In some embodiments, latency of each network link may be predetermined, that is, known. In such embodiments, the compute may calculate the data communications latency from the root to the compute node by summing the known latency of each of the two network links coupling the compute node to the root.

A pulse waiter, as the term is used here, refers to a thread configured to 'wait' for a pulse signal from a root node and take a predefined action upon receiving the pulse signal. In this example, the pulse waiter 'receives' the pulse signal via the wakeup unit. In embodiments in which a compute node includes multiple processor cores and each core executes a plurality of threads, a thread on each core of the compute node may be designated as a pulse waiter.

The wakeup unit may be logic or a thread of execution configured to wake—that is, notify—the pulse waiter responsive to receiving a pulse signal from the root node. In some embodiments, the wakeup unit is implemented as firmware or logic for a network communications adapter. Initializing (606) such a wakeup unit may be carried out in various ways, including providing the wakeup unit with memory locations accessible by the pulse waiter, a process identifier for the pulse waiter, and so on.

In the method of FIG. 6, performing (608) a local barrier operation includes performing a barrier with each thread executing in the compute node. A barrier operation is a function called by one thread in a defined group, where the caller is blocked until all other threads of the defined group have also called the function. A barrier operation may be used to synchronize compute nodes or threads that are otherwise executing independently and in parallel with one another. The term 'local' here indicates that a barrier operation is performed within a single compute node while the term 'global' indicates that a barrier operation is performed amongst many compute nodes.

The method of FIG. 6 continues by determining (610) whether all nodes have performed the local barrier operation—determining whether all nodes have calculated a node-specific data transmission latency. If not, the method continues in another iteration of latency calculation for another node.

Upon each node completing the local barrier operation, the method of FIG. 6 continues by entering (612), by all compute nodes, a global barrier operation and upon all the compute nodes entering the global barrier operation, sending (614), by the root node to all the compute nodes, a pulse signal. The root node may send (614) a pulse signal by broadcasting a predefined message throughout the tree network.

Then, for each compute node upon receiving the pulse signal: the method of FIG. 6 includes waking (616), by the wakeup unit, the pulse waiter; setting (620) a time base for the compute node equal to the data transmission latency between the root node and the compute node; and exiting (622) the global barrier operation.

A time base for a compute node, as the phrase is used here, is a clock used by a compute node in program execution, in error logging, in messaging, and in other aspects of parallel application execution. Moreover, synchronization of clocks of two different nodes of the same parallel computer may be useful in the same aspects of parallel application execution. In a parallel computer with many compute nodes, however, each compute node may have a different initial time base when booted and such time bases (such clocks) may vary slightly in rate when compute nodes are non-homogeneous. Over a period of time, then, one compute node's time base may not match or by synchronized with another compute node's time base. In the method of FIG. 6, the compute nodes' time bases are synchronized by setting (620), in parallel, the time base as equal to the calculated data transmission latency. Effectively, this method assumes that the moment the root sends the pulse signal to all other compute nodes is some initial time, say time=0. Other compute nodes set the node's time base equal to the initial time plus an offset—the amount of time the pulse signal takes to arrive at the compute node. In embodiments in which the compute nodes are non-homogenous, the time bases of each compute node may skew slightly with respect to on another over time. To that end, the method of FIG. 7 may be carried out periodically, at a predefined interval of time, re-synchronizing the time bases of the compute nodes.

Readers of skill in the art will recognize that, in order to reduce noise or random occurrences in the tree the network that affect the operation of the compute nodes in the tree network, the method of FIG. 6 may be performed when the network and all nodes in the network are performing no other tasks. Further, prior to carrying out the method of FIG. 6, link errors may be identified and corrected such that the measured latencies between the compute nodes is not artificially large due to error.

Figure 7:
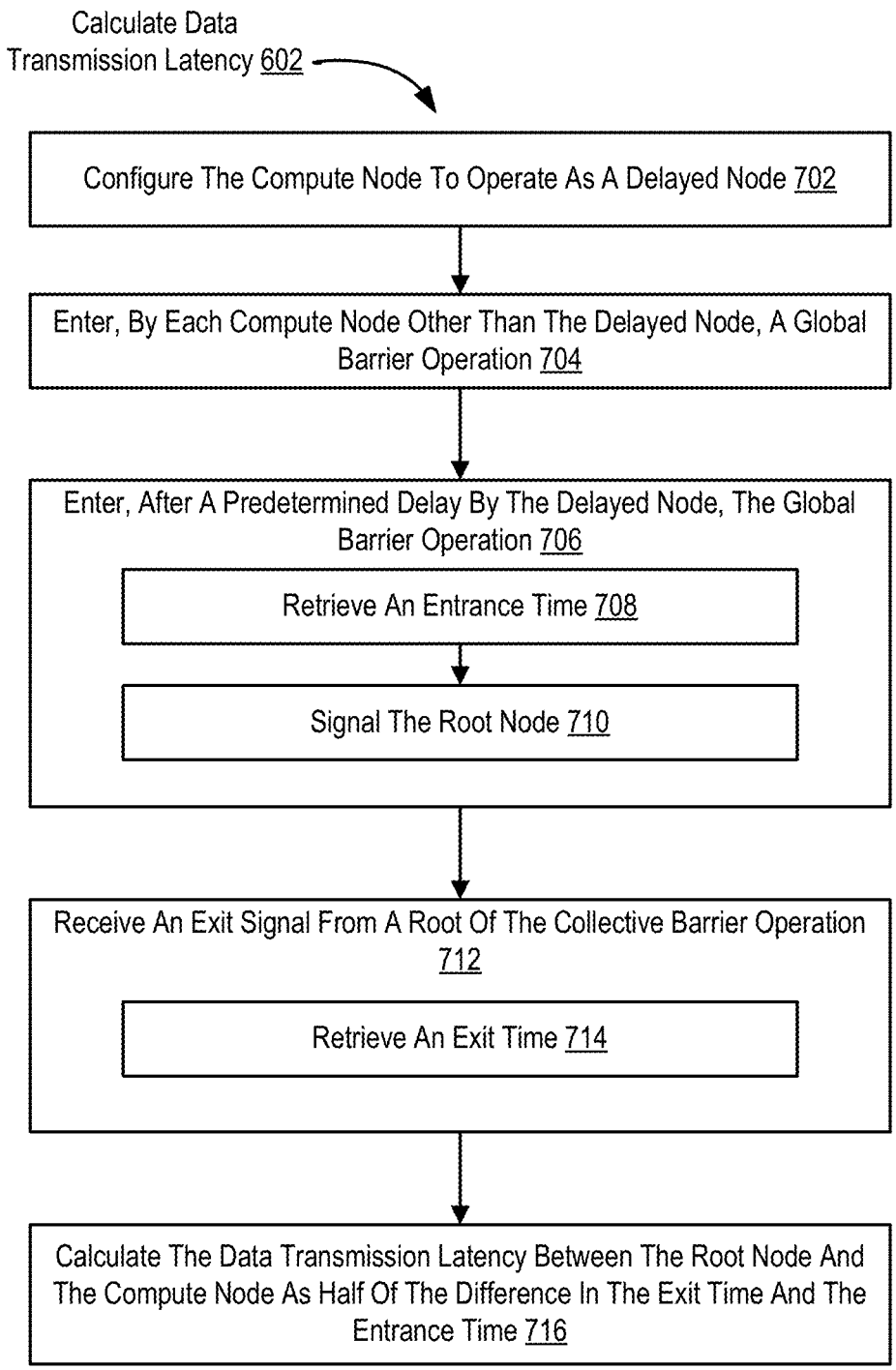
FIG. 7 sets forth a flow chart illustrating an example method of calculating data transmission latency from a root node to a compute node while synchronizing compute node time bases in a parallel computer according to embodiments of the present invention.

For further explanation, FIG. 7 sets forth a flow chart illustrating an example method of calculating (602) data transmission latency from a root node to a compute node while synchronizing compute node time bases in a parallel computer according to embodiments of the present invention. The method of FIG. 7 sets forth a single iteration of such calculation (602). That is, the method of FIG. 7 depicts calculating (602) data transmission latency for a single node. IN embodiments of the present invention, however, the method of FIG. 7 is carried out once for each compute node in the network tree—as described above with respect to FIG. 6—until each compute node has calculated (602) a node-specific data transmission latency.

The method of FIG. 7 includes configuring (702) the compute node to operate as a delayed node. A delayed node is a compute node configured to enter a global barrier after all other compute nodes have entered the global barrier. To that end, the method of FIG. 7 also includes entering (704), by each compute node other than the delayed node, a global barrier operation. Then, after a predetermined delay, the method of FIG. 7 includes entering (706), by the delayed node, the global barrier operation. In the method of FIG. 7, the predetermined delay is a value set at boot time of the compute node. The value of the delay may be predetermined by running the barrier operation a number of times and determining the barrier operation's typical (average or max) time of completion. The delay may be set as a time greater than the typical time of barrier completion. In this way, the delayed node will enter the barrier operation well after all other nodes have entered the barrier operation. In other embodiments, the delayed node may enter (706) the barrier operation after the predetermined delay by executing a predefined delay operation. Such a predefined delay operation may be configured such that the execution of the operation is carried out in a period of time greater than a period of time required for other nodes to enter the global barrier operation.

In the method of FIG. 7, entering (706), by the delayed node, the global barrier operation includes retrieving (708) an entrance time and signaling (710) the root node. The method of FIG. 7 also includes receiving (712) an exit signal from the root node. In the method of FIG. 7, receiving (712) an exit signal from the root node includes retrieving (714) an exit time.

The method of FIG. 7 also includes calculating the data transmission latency between the root node and the compute node as half of the difference in the exit time and the entrance time. Effectively, the difference in exit time and the entrance time reflects the time a signal takes to travel from the delayed node to the root and back. As such, half of this time, generally reflects the time a signal takes to travel from the root to the delayed node.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable transmission medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable transmission medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable transmission medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for synchronizing compute node time bases in a parallel computer, the compute nodes organized for data communications in a tree network, one compute node in the tree network designated as a root node, each compute node executing a plurality of threads, the apparatus comprising a computer processor, a computer memory operatively coupled to the computer processor, the computer memory having disposed within it computer program instructions that, when executed, cause the apparatus to carry out the steps of:
   for each compute node: calculating data transmission latency from the root node to the compute node, including: configuring the compute node to operate as a delayed node; entering, by each compute node other than the delayed node, a global barrier operation; entering, after a predetermined delay by the delayed node, the global barrier operation including retrieving an entrance time and signaling the root node; receiving an exit signal from the root node, including retrieving an exit time; and calculating the data transmission latency between the root node and the compute node as half of the difference in the exit time and the entrance time; configuring a thread of the compute node as a pulse waiter;
   initializing a wakeup unit, the wakeup unit configured to wake the pulse waiter responsive to receiving a pulse signal from the root node; and performing a local barrier operation, including for each compute node, performing a barrier with each thread in the plurality of threads;
   upon each node completing the local barrier operation, entering, by all compute nodes, a global barrier operation;
   upon all the compute nodes entering the global barrier operation, sending, by the root node to all the compute nodes, a pulse signal; and
   for each compute node upon receiving the pulse signal: waking, by the wakeup unit, the pulse waiter; setting a time base for the compute node equal to the data transmission latency between the root node and the compute node using the pulse signal, thereby synchronizing each compute node and the plurality of threads of each compute node; and exiting the global barrier operation.

2. The apparatus of claim 1 wherein the predetermined delay comprises a value set at boot time of the compute node.

3. The apparatus of claim 1, wherein entering, after a predetermined delay by the delayed node, the global barrier operation further comprises:
   executing, by the delayed node, a predefined delay operation, wherein the execution is carried out in a period of time greater than a period of time required for other nodes to enter the global barrier operation.

4. The apparatus of claim 1 wherein calculating data transmission latency from the root node to the compute node further comprises calculating the data transmission latency as the sum of the predetermined latency of network links coupling the compute node to the root node.

5. The apparatus of claim 1 wherein the parallel computer comprises a non-homogenous parallel computer, wherein one or more of the compute nodes comprise disparate computer hardware and software configurations, and the method further comprises periodically, at a predefined interval of time, re-synchronizing the time bases of the compute nodes.

6. The apparatus of claim 1 wherein each compute node comprising a plurality of processor cores, each core executing a plurality of threads, each core comprising a thread designated as a pulse waiter.

7. A computer program product for synchronizing compute node time bases in a parallel computer, the compute nodes organized for data communications in a tree network, one compute node in the tree network designated as a root node, each compute node executing a plurality of threads, the computer program product disposed upon a computer readable medium wherein the computer readable medium is not a signal, the computer program product comprising computer program instructions that, when executed, cause a computer to carry out the steps of:
   for each compute node: calculating data transmission latency from the root node to the compute node, including: configuring the compute node to operate as a delayed node; entering, by each compute node other than the delayed node, a global barrier operation; entering, after a predetermined delay by the delayed node, the global barrier operation including retrieving an entrance time and signaling the root node; receiving an exit signal from the root node, including retrieving an exit time; and calculating the data transmission latency between the root node and the compute node as half of the difference in the exit time and the entrance time; configuring a thread of the compute node as a pulse waiter;
   initializing a wakeup unit, the wakeup unit configured to wake the pulse waiter responsive to receiving a pulse signal from the root node; and performing a local barrier operation, including for each compute node, performing a barrier with each thread in the plurality of threads;
   upon each node completing the local barrier operation, entering, by all compute nodes, a global barrier operation;
   upon all the compute nodes entering the global barrier operation, sending, by the root node to all the compute nodes, a pulse signal; and
   for each compute node upon receiving the pulse signal: waking, by the wakeup unit, the pulse waiter; setting a time base for the compute node equal to the data transmission latency between the root node and the compute node using the pulse signal, thereby synchronizing each compute node and the plurality of threads of each compute node; and exiting the global barrier operation.

8. The computer program product of claim 7 wherein the predetermined delay comprises a value set at boot time of the compute node.

9. The computer program product of claim 7, wherein entering, after a predetermined delay by the delayed node, the global barrier operation further comprises:
   executing, by the delayed node, a predefined delay operation, wherein the execution is carried out in a period of time greater than a period of time required for other nodes to enter the global barrier operation.

10. The computer program product of claim 7 wherein calculating data transmission latency from the root node to the compute node further comprises calculating the data transmission latency as the sum of the predetermined latency of network links coupling the compute node to the root node.

11. The computer program product of claim 7 wherein the parallel computer comprises a non-homogenous parallel computer, wherein one or more of the compute nodes comprise disparate computer hardware and software configurations, and the method further comprises periodically, at a predefined interval of time, re-synchronizing the time bases of the compute nodes.

12. The computer program product of claim 7 wherein each compute node comprising a plurality of processor cores, each core executing a plurality of threads, each core comprising a thread designated as a pulse waiter.

* * * * *